US011108354B2

(12) United States Patent
Carrington

(10) Patent No.: US 11,108,354 B2
(45) Date of Patent: Aug. 31, 2021

(54) PORTABLE POWER GENERATOR

(71) Applicant: Scott Carrington, Calgary (CA)

(72) Inventor: Scott Carrington, Calgary (CA)

(*) Notice: Subject to any disclaimer, the term of this patent is extended or adjusted under 35 U.S.C. 154(b) by 114 days.

(21) Appl. No.: 16/240,616

(22) Filed: Jan. 4, 2019

(65) Prior Publication Data

US 2019/0267935 A1 Aug. 29, 2019

Related U.S. Application Data

(63) Continuation-in-part of application No. 15/908,468, filed on Feb. 28, 2018, now Pat. No. 10,727,778.

(51) Int. Cl.
*H02S 30/20* (2014.01)
*B65D 90/00* (2006.01)
*B65D 88/12* (2006.01)

(52) U.S. Cl.
CPC .............. *H02S 30/20* (2014.12); *B65D 88/12* (2013.01); *B65D 90/008* (2013.01)

(58) Field of Classification Search
CPC ...................................................... H02S 30/20
See application file for complete search history.

(56) References Cited

U.S. PATENT DOCUMENTS

| 8,593,102 B2 | 11/2013 | McGuire et al. |
| 8,839,574 B1 | 9/2014 | Gill et al. |
| 9,612,039 B2 | 4/2017 | Meppelink et al. |
| 9,789,025 B2 | 10/2017 | Henshue et al. |
| 2006/0021447 A1 | 2/2006 | Hecht et al. |
| 2010/0206354 A1 | 8/2010 | Greene, Jr. et al. |
| 2011/0260533 A1 | 10/2011 | Hardin |
| 2012/0291847 A1 | 11/2012 | Rowe, Jr. et al. |
| 2014/0230877 A1 | 8/2014 | Goldberg et al. |
| 2014/0238467 A1 | 8/2014 | Martin et al. |
| 2015/0001201 A1 | 1/2015 | Adler et al. |
| 2015/0059825 A1 | 3/2015 | Swatek et al. |
| 2015/0162865 A1 | 6/2015 | Cowham |

(Continued)

FOREIGN PATENT DOCUMENTS

| CA | 2881334 | 2/2014 |
| CN | 200947581 | 7/2006 |
| CN | 103191891 | 7/2013 |

(Continued)

OTHER PUBLICATIONS

International Searching Authority, The International Search Report and the Written Opinion of the International Searching Authority, or the Declaration, International Application No. PCT/CA2019/050022 Filed Jan. 7, 2019, 8 pages, Receiving Office—Canadian Intellectual Property Office.

*Primary Examiner* — Shannon M Gardner
(74) *Attorney, Agent, or Firm* — Richard D. Okimaw

(57) ABSTRACT

A method and apparatus for portable power generation comprises an intermodal container having a front, a rear, a top and a bottom and extending between first and second ends, the intermodal container having a front and a rear corner post extending between the top and the bottom at each of the first and second ends. The apparatus further comprises a door hingedly secured to each of the front corner posts and at least one solar panel hinged to a top edge of the door, wherein the door is operable to pivot between a closed position extending between the front and the rear of the intermodal container, and an open position extending in planar alignment with the front of the intermodal container.

21 Claims, 12 Drawing Sheets

(56) References Cited

U.S. PATENT DOCUMENTS

| | | |
|---|---|---|
| 2016/0285404 A1 | 9/2016 | Aikens et al. |
| 2017/0272030 A1 | 9/2017 | Chow |

FOREIGN PATENT DOCUMENTS

| | | |
|---|---|---|
| CN | 204190686 | 3/2015 |
| CN | 104320067 | 2/2017 |
| KR | PCT/KR2015/006530 | 9/2016 |
| WO | 2013179223 | 12/2013 |
| WO | 2015164913 | 11/2015 |
| WO | 2016091711 | 6/2016 |
| WO | 2017044911 | 3/2017 |

PORTABLE POWER GENERATOR

CROSS REFERENCE TO RELATED APPLICATION

This application is a Continuation-in-Part of U.S. patent application Ser. No. 15/908,468 filed Feb. 28, 2018 entitled Portable Power Generator.

BACKGROUND OF THE INVENTION

1. Field of Invention

The present invention relates generally to portable power generation and in particular to a solar panel apparatus for a standard intermodal container.

2. Description of Related Art

Solar energy is a renewable, environmentally sustainable alternate energy source which can be used at virtually any location. Some remote sites requiring electrical power utilize a solar cell system to produce the required power. Such remote sites also often require shelter to house equipment and to provide a temporary work environment on site.

To provide both shelter and power, standard intermodal containers equipped with solar panel systems have been utilized. WIPO International Publication No. WO 2015/164913 A1, Pyne, describes a portable power station including a solar array secured to an intermodal container. In this prior art, the solar panels are fixed into position on a flat horizontal plane, with some panels cantilevered outwards from the container. Such an arrangement is disadvantageous in environments where there can be snow accumulation on the panels, which will not naturally disengage from a flat surface, and the weight of the snow on the cantilevered panels may result in collapse. As is commonly known in the art, solar panels should be positioned at an angle to capture the maximum amount of sunlight appropriate for the latitude of the location. A horizontal configuration does not take latitude location into account, and thus is not as efficient as possible.

US Patent Application Publication Nos. 2015/0162865 A1, Cowham, and 2016/0285404 A1, Aikens et al., describe an arrangement with a V-shaped solar panel roof structure. This arrangement is also disadvantageous in a snowy climate, with snow accumulating in the "V", blocking the sun's rays from reaching the panels and potentially causing damage to the panels with the weight of the snow.

U.S. Pat. No. 9,612,039 B2, Meppelink et al., utilizes solar panels positioned at an angle. Disadvantageously, the solar panel array width, and thus the potential power output, is limited to the length of the container, with all panels supported by the main body of the container.

SUMMARY OF THE INVENTION

According to a first embodiment of the present invention there is disclosed an apparatus for portable power generation comprising an intermodal container having a front, a rear, a top and a bottom and extending between first and second ends, the intermodal container having a front and a rear corner post extending between the top and the bottom at each of the first and second ends. The apparatus further comprises a door hingedly secured to each of the front corner posts and at least one solar panel hinged to a top edge of the door, wherein the door is operable to pivot between a closed position extending between the front and the rear of the intermodal container, and an open position extending in planar alignment with the front of the intermodal container.

The at least one solar panel may be pivotable between a first position parallel to the door and a second extended position with a tilt angle between the at least one solar panel and the door. The tilt angle may be between 0 and 90 degrees.

The apparatus may further comprise at least one door support brace extending between proximate and distal ends, the at least one door support brace may be pivotably secured to the at least one solar panel at the proximate end. The door may include at least one door support bracket on an outer surface of the door.

The distal end of the at least one door support brace may be selectably securable to the at least one door support bracket.

The door may include at least one strut extending between proximate and distal ends, the at least one strut may be pivotably secured to an inner surface of the door at the proximate end. The at least one strut may be selectably securable to the intermodal container in the open position.

The door may comprise two standard intermodal container doors. The two standard intermodal container doors may be secured together to form one door. The two standard intermodal container doors may include hinges securable with hinge pins to the front and rear corner posts. The hinges may be secured to the front corner posts with the hinge pins.

The apparatus may further comprise at least one solar panel hinged to a top front edge of the intermodal container. The at least one solar panel may comprise a front solar panel pivotable between a front first position parallel to the front of the intermodal container and a front second extended position with a front tilt angle between the front solar panel and the front of the intermodal container. The at least one solar panel may comprise a top solar panel pivotable between a top first position parallel to the top of the intermodal container and a top second extended position with a top tilt angle between the top solar panel and the top of the intermodal container.

According to a further embodiment of the present invention there is disclosed a method for portable power generation comprising locating an intermodal container at a desired location and pivoting an end door extending between front and rear of the intermodal container about a front corner post on the intermodal container to an open position such that the end door is in planar alignment with a front of the intermodal container. The method further comprises pivoting at least one door solar panel about a top edge of the end door into an extended position with a door extension angle between the at least one door solar panel and the door, pivoting at least one top solar panel about a top front edge of the intermodal container into a top extended position with a top extension angle between the at least one top solar panel and a top of the intermodal container and pivoting at least one front solar panel about a top front edge of the intermodal container into a front extended position with a front extension angle between the at least one front solar panel and the front of the intermodal container.

The method may further comprise securing the end door in the open position with at least one strut extending between the end door and the intermodal container.

The method may further comprise securing the at least one door solar panel in the extended position with at least one door support brace extending between the at least one door solar panel and the end door.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
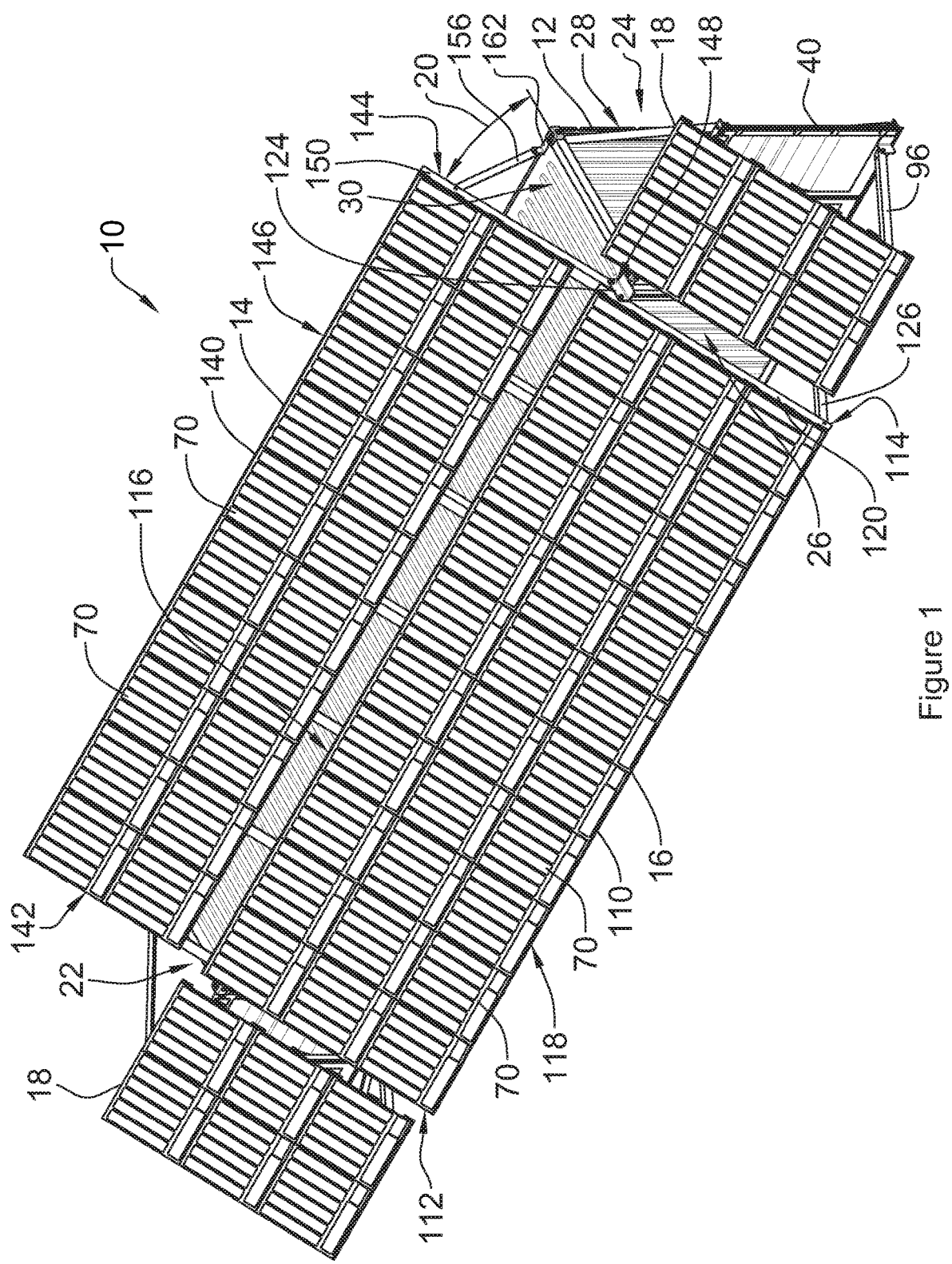
FIG. 1 is a front perspective view of an apparatus for portable power generation according to a first embodiment of the present invention, with the solar panels in a deployed position.
Figure 2:
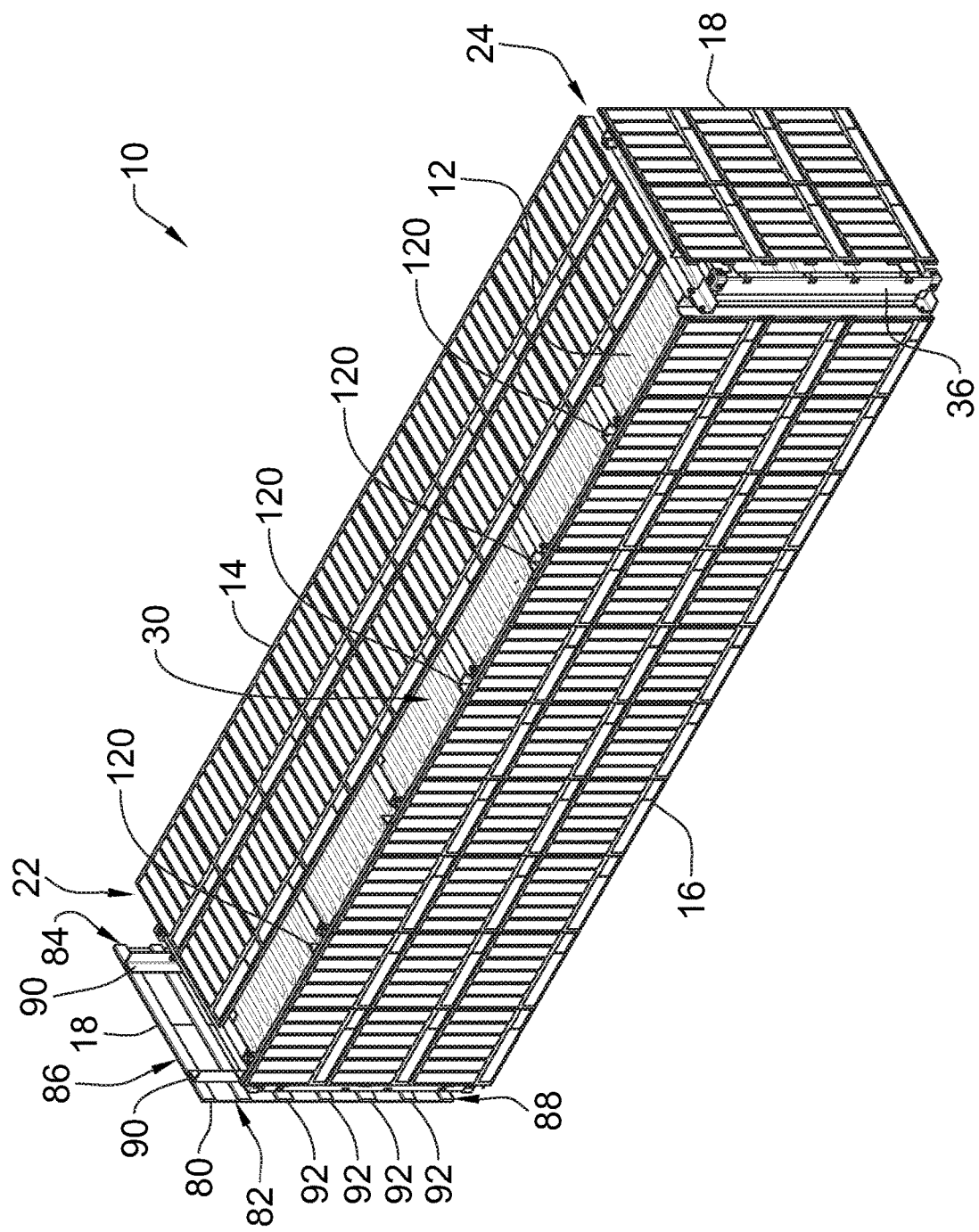
FIG. 2 is a front perspective view of the apparatus of FIG. 1, with the solar panels in a stored position.

Referring to FIGS. 1 and 2, an apparatus for portable power generation according to a first embodiment of the invention is shown generally at 10. The apparatus 10 is comprised of a standard intermodal container 12 with top, front and end solar panels, 14, 16 and 18, respectively, pivotably secured thereto, as will be set out below. The solar panels, 14, 16 and 18, may be positioned in a stored position for storage or transportation, as illustrated in FIG. 2, or in a deployed position, as illustrated in FIG. 1, with the solar panels 14, 16 and 18 aligned and positioned with a tilt angle 20 from horizontal.

Figure 3:
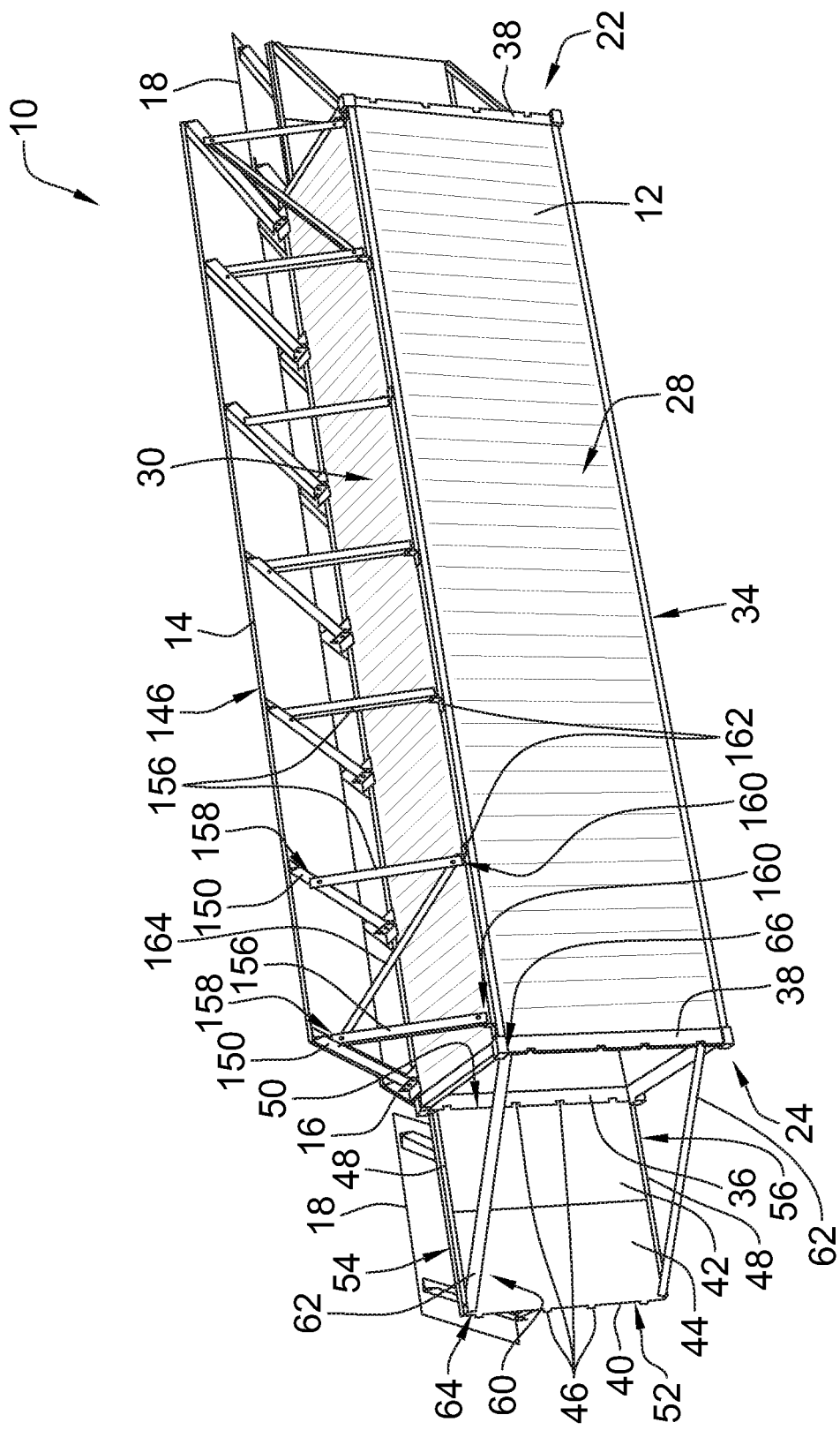
FIG. 3 is a rear perspective view of the apparatus of FIG. 1, in the deployed position.

Referring now to FIGS. 1 through 3 the container 12 extends between first and second ends, 22 and 24, respectively and includes a front 26, rear 28, top 30 and bottom 34. At each of the first and second ends, 22 and 24, front and rear corner posts, 36 and 38, respectively, extend between the top 30 and bottom 34, respectively at the front 26 and rear 28, as is commonly known in the art and best illustrated in FIGS. 3 and 6. At each end, 22 and 24, a door 40 is hingedly secured to the front corner post 36.

Figure 4:
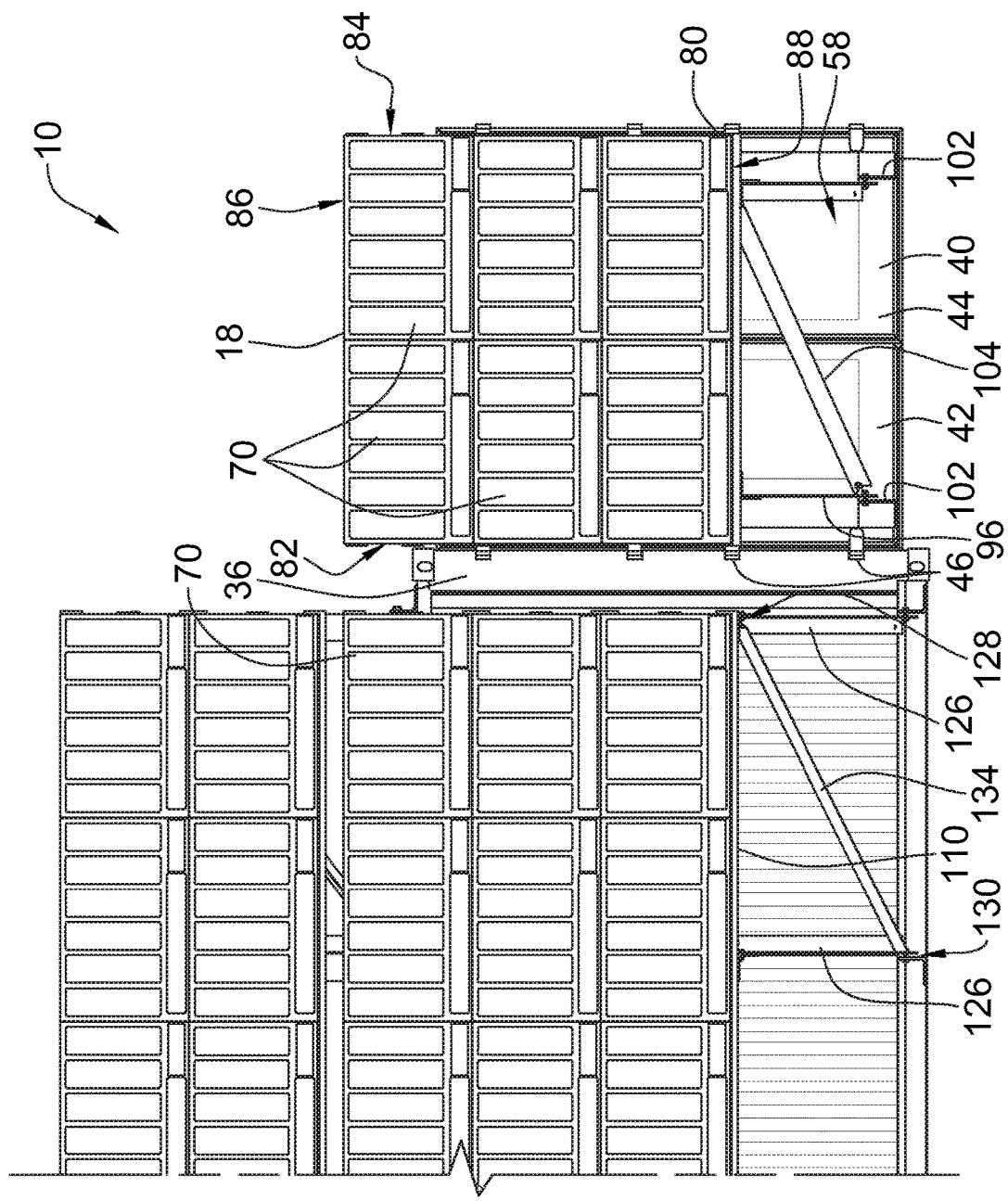
FIG. 4 is a front view at the second end of the apparatus, in the deployed position.
Figure 5:
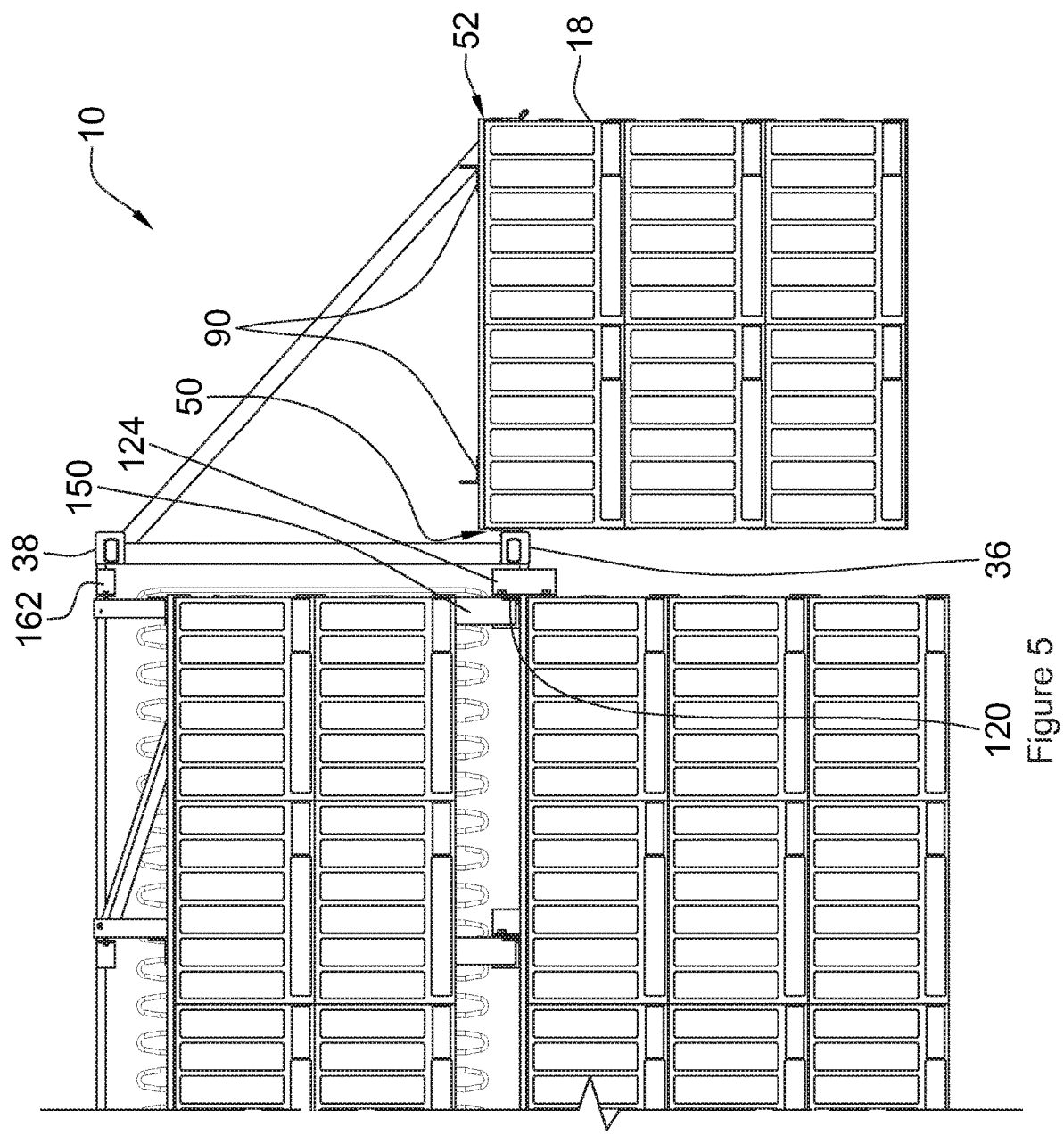
FIG. 5 is a plan view at the second end of the apparatus, in the deployed position.
Figure 6:
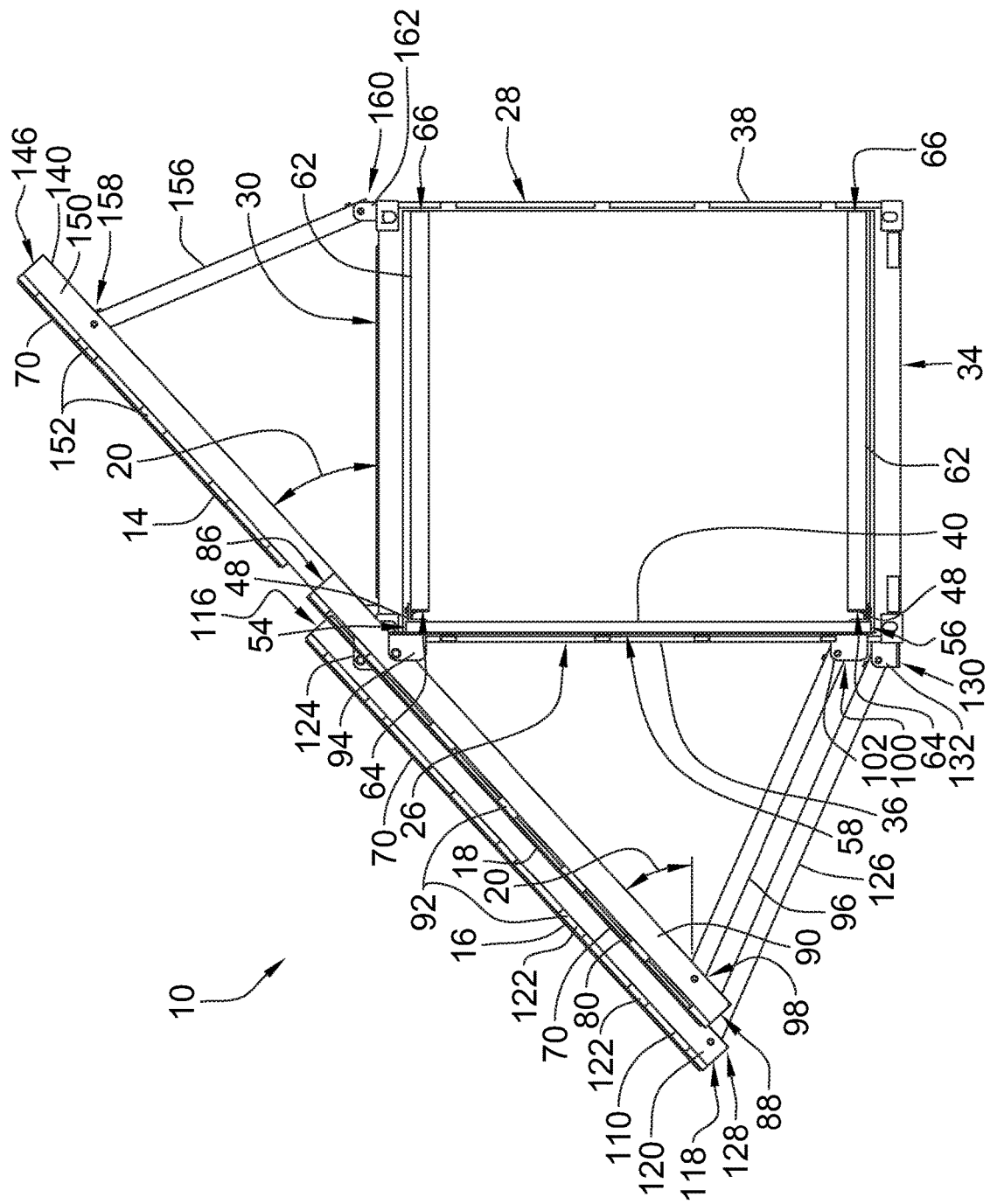
FIG. 6 is a side view at the second end of the apparatus, in the deployed position.

Referring now to FIGS. 3 through 6, each door 40 extends between door front and door rear edges, 50 and 52, respectively, and between door top and door bottom edges, 54 and 56, respectively, and includes front and rear surfaces, 58 and 60, respectively. On a standard container 12, the door 40 is comprised of front and rear doors, 42 and 44, respectively, with the front door 42 extending from the door front edge 50 and the rear door 44 extending from the door rear edge 52. Each door 42 and 44 includes a plurality of hinges 46 used to join each door, 42 and 44, to the container 12 at the front and rear corner posts, 36 and 38. To configure the apparatus 10 such that there is one door 40 at each end, 22 and 24, the front and rear doors 42 and 44 are secured together with at least one rigid elongate member 48 extending between the door front and door rear edges, 50 and 52 on the rear surface 60. As illustrated in FIGS. 3 and 6, the elongate members 48 may be located proximate to the door top and door bottom edges, 54 and 56. The elongate members 48 may be such as, by way of non-limiting example, angle iron or wood boards. It will be appreciated that the two doors 42 and 44 may be secured together by any known means, such as, by way of non-limiting example, welding or fasteners. Hinge pins (not shown) are removed from the plurality of hinges 46 joining the rear door 44 to the rear corner post 38 at the door rear edge 52 such that the joined door 40 pivots about the hinges 46 secured to the front corner post 36 at the door front edge 50.

At least one door support strut 62 extends between the door 40 and the container 12. Each door support strut 62 extends between first and second ends, 64 and 66, respectively. The first end 64 of the door support strut 62 is pivotably secured to the door 40 at the rear surface 60 proximate to the door rear edge 52 and extends to the rear corner post 38 when the door 40 is in the open position, as best illustrated in FIG. 3. As illustrated in FIG. 6, each door support strut 62 may be pivotably secured to the elongate member 48 at the first end 64. The second end 66 may be secured to the rear corner post 38 by any known means, such as, by way of non-limiting example, a fastener secured to a bracket. The length of each door support strut 62 is selected such that each door 40 is maintained in a position aligned with the front 26 of the container 12 when secured in the open position.

Each end solar panel 18 is comprised of a plurality of solar cells 70 secured on a door mounting assembly 80. The door mounting assembly 80 extends between first and second edges, 82 and 84, respectively, and between top and bottom edges 86 and 88, respectively. As best seen on FIG. 2, each door mounting assembly 80 includes a pair of elongate vertical support members 90 extending between the top and bottom edges, 86 and 88, with a plurality of elongate horizontal support members 92 extending between the first and second edges, 82 and 84, mounted on the vertical support members 90 to form a frame onto which the solar cells 70 are secured. The vertical support members 90 may be formed using such as, by way of non-limiting example, angle iron. The horizontal support members 92 may be formed using such wood or composite boards. As illustrated in FIG. 6, each vertical support member 90 is pivotably mounted to a door support top bracket 94 secured to the font surface 58 of the door 40 proximate to the door top edge 54. The door support top bracket 94 extends past the door top edge 54 allowing the door mounting assembly 80 to pivot thereabove. A door support brace 96, which extends between first and second ends, 98 and 100, respectively, is pivotably secured proximate to the first end 98 to each vertical support member 90 proximate to the bottom edge 88. The second end 100 of each door support brace 96 may be selectively secured to a corresponding door support bottom bracket 102 secured to the front surface 58 of the door 40 proximate to the door bottom edge 56. As illustrated in FIG. 4, a door cross brace 104 extends between the door support braces 96, secured proximate to the first end 98 on one door support brace 96 and proximate to the second end 100 on the other door support brace 96. The length of the door support braces 96 is selected such that the end solar panel 18 is positioned at a tilt angle 20 from horizontal when secured in the deployed position, as illustrated in FIG. 6. The tilt angle 20 is selected dependent on the latitude of the installation location of the apparatus 10, as is commonly known in the art, and may be such as, by way of non-limiting example, in the range of 0 to 90 degrees.

The front solar panel 16 is formed in a similar manner to the end solar panels 18, and includes a plurality of solar cells 70 secured on a front mounting assembly 110. Referring to FIGS. 1 and 6, the front mounting assembly 110 extends between first and second edges, 112 and 114, respectively, and between top and bottom edges 116 and 118, respectively. Each front mounting assembly 110 includes a plurality of elongate vertical support members 120 extending between the top and bottom edges, 116 and 118, with a plurality of elongate horizontal support members 122 extending between the first and second edges, 112 and 114, mounted on the vertical support members 120 to form a frame onto which the solar cells 70 are secured. The vertical support members 120 may be formed using such as, by way of non-limiting example, angle iron. The horizontal support members 122 may be formed using such as, by way of non-limiting example, wood or composite boards. As illustrated in FIGS. 1, 5 and 6, each vertical support member 120 is pivotably mounted to a top support bracket 124 secured to the top 30 of the container 12 proximate to, and extending past, the front 26. The top support bracket 124 extends past the front 26 allowing the front mounting assembly 110 to pivot over the top 30. A front support brace 126, which extends between first and second ends, 128 and 130, respectively, is pivotably secured proximate to the first end 128 to each vertical support member 120 proximate to the bottom edge 118. The second end 130 of each front support brace 126 may be selectively secured to a corresponding front support bottom bracket 132 secured to the front 26 of the container 12 proximate to the bottom 34. As illustrated in FIG. 4, a front cross brace 134 extends between the front support braces 126, secured proximate to the first end 128 on one front support brace 126 and proximate to the second end 130 on another front support brace 126. The length of the front support braces 126 is selected such that the front solar panel 16 is positioned at the tilt angle 20 from horizontal when secured in the deployed position, as illustrated in FIG. 6, and as set out above.

The front solar panel 16 includes a plurality of solar cells 70 secured on a top mounting assembly 140. Referring to FIGS. 1 and 6, the top mounting assembly 140 extends between first and second edges, 142 and 144, respectively, and between top and bottom edges 146 and 148, respectively. Each top mounting assembly 140 includes a plurality of elongate vertical support members 150 extending between the top and bottom edges, 146 and 148, with a plurality of elongate horizontal support members 152 extending between the first and second edges, 142 and 144, mounted on the vertical support members 150 to form a frame onto which the solar cells 70 are secured. As best illustrated in FIGS. 1 and 2, the horizontal support members 152 and solar cells 70 are mounted to a portion of the vertical support members 150 extending from the top edge 146, with a portion of the vertical support members 150 exposed proximate to the bottom edge 148. The vertical support members 150 may be formed using such as, by way of non-limiting example, angle iron. The horizontal support members 152 may be formed using such as, by way of non-limiting example, wood or composite boards. As illustrated in FIGS. 1 and 5, each vertical support member 150 is pivotably mounted to the top support bracket 124. A top support brace 156, which extends between first and second ends, 158 and 160, respectively, is pivotably secured proximate to the first end 158 to each vertical support member 150 proximate to the top edge 146. The second end 160 of each top support brace 156 may be selectively secured to a corresponding top rear support bracket 162 secured to the top 30 of the container 12 proximate to the rear 28, as illustrated in FIGS. 3 and 6. As illustrated in FIG. 3, a top cross brace 164 extends between the top support braces 156, secured proximate to the first end 158 on one top support brace 156 and proximate to the second end 160 on another top support brace 156. The length of the top support braces 156 is selected such that the top solar panel 14 is positioned at the tilt angle 20 from horizontal when secured in the deployed position, as illustrated in FIG. 6, and as set out above.

To position the apparatus 10 in the deployed position, as illustrated in FIG. 1, the apparatus 10 is transported to the desired site in the stored position, as illustrated in FIG. 2. As is commonly known in the art, the front 26 is positioned to face true south when located in the northern hemisphere, or true north when located in the southern hemisphere. The doors 40 are then pivoted about the hinges 46 on the front corner posts 36 such that the doors 40 are aligned parallel to the front 26. The second end 66 of the door support struts 62 are then secured to the rear corner posts 38 to maintain the doors 40 in the open position. The top solar panel 14 is pivoted up from the top 30 and the top support braces 156 are secured to the top rear support brackets 162. The front solar panel 16 is pivoted out from the front 26 and the front support braces 126 are secured to the front support bottom brackets 132. The end solar panels 18 are pivoted out from the doors 40 and the door support braces 96 are secured to the door support bottom brackets 102.

Figure 7:
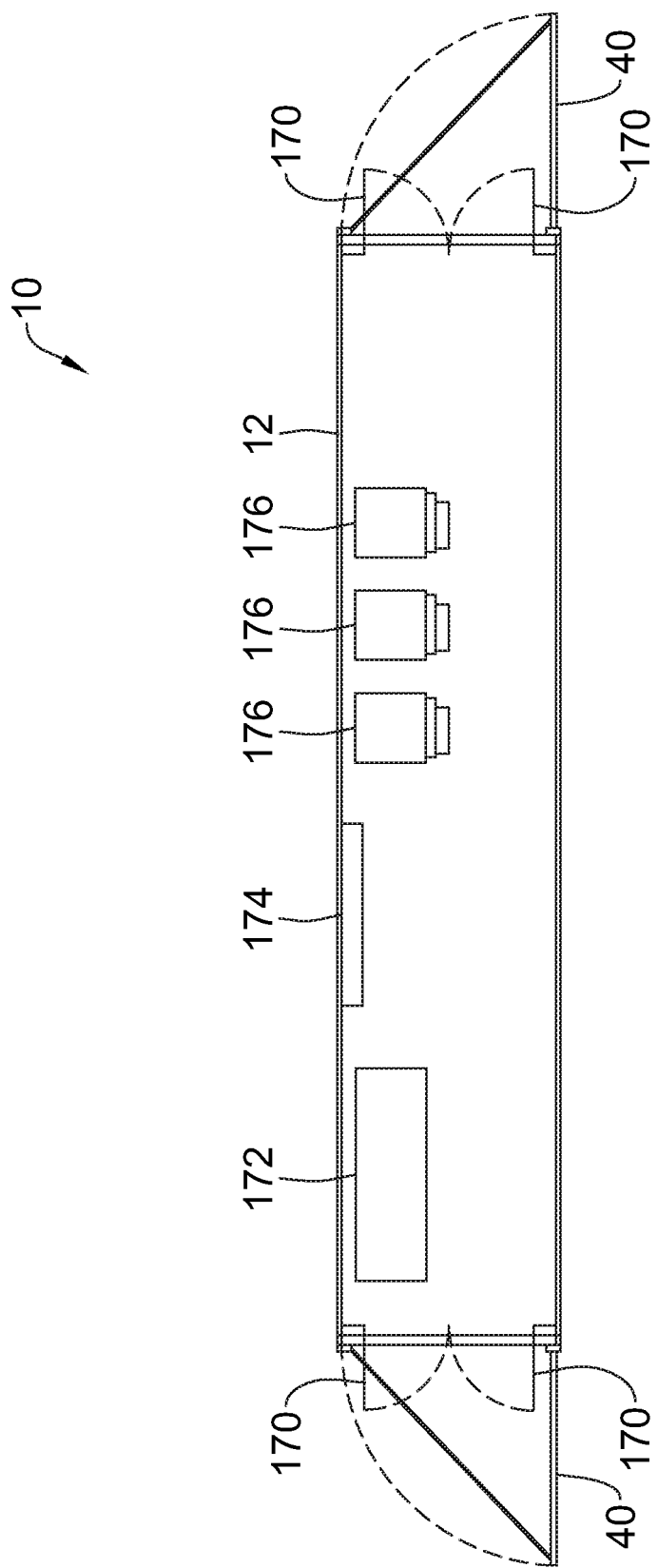
FIG. 7 is a plan diagram of the apparatus, with a sample interior layout.

Turning now to FIG. 7, a sample interior layout of the container 12 is illustrated. The container 12 may be equipped with additional doors 170 to secure the interior of the container 12. A backup generator 172 may be included, as well as inverters 174 to convert the DC output of the solar cells 70 or the generator 172 to AC for use by field equipment. A plurality of cabinets 176 may be used to store equipment or batteries. It will be appreciated that other configurations may be useful, as well.

Figure 8:
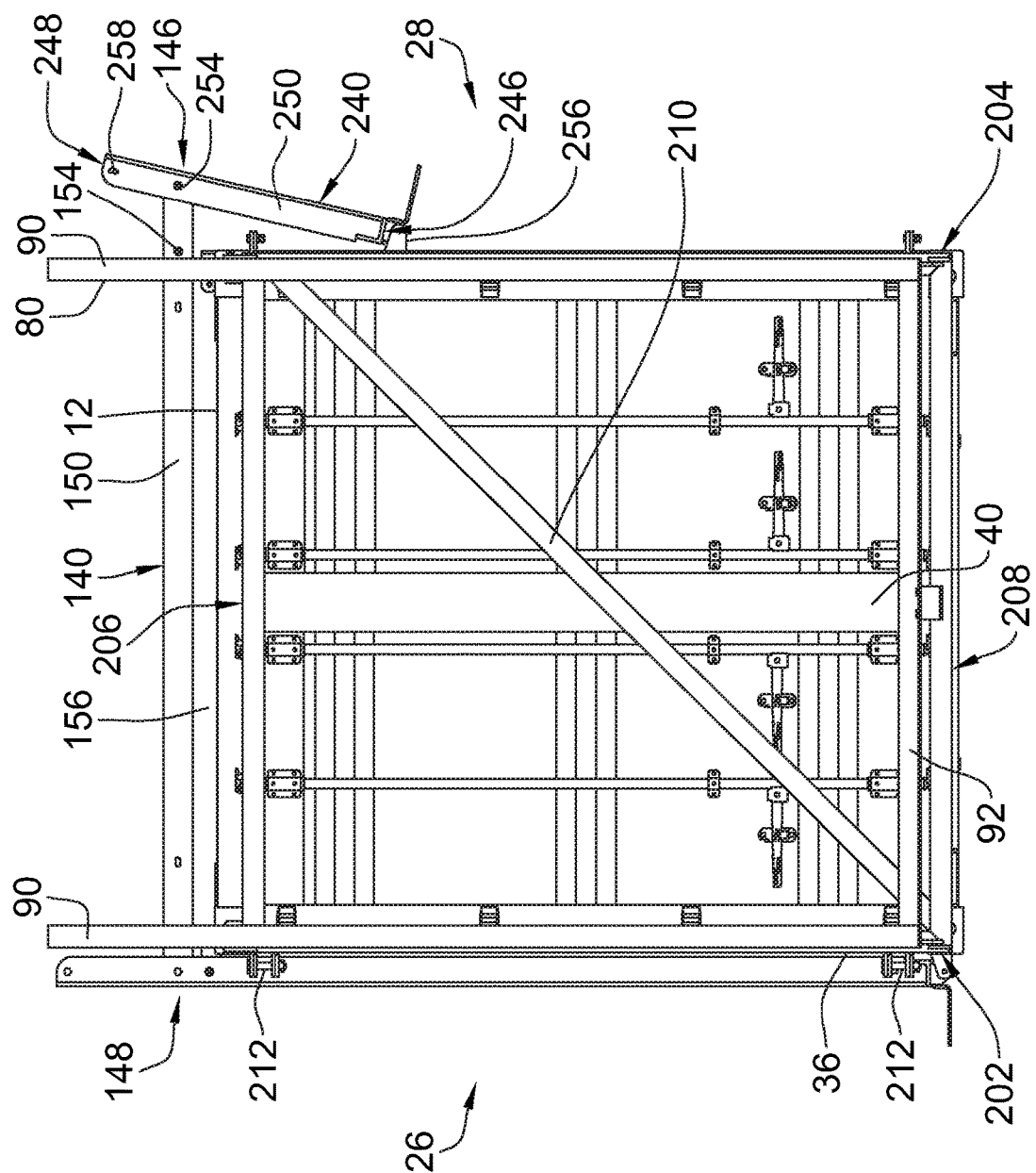
FIG. 8 is a side view of the second end of the apparatus in a stored position according to a further embodiment of the present invention.
Figure 9:
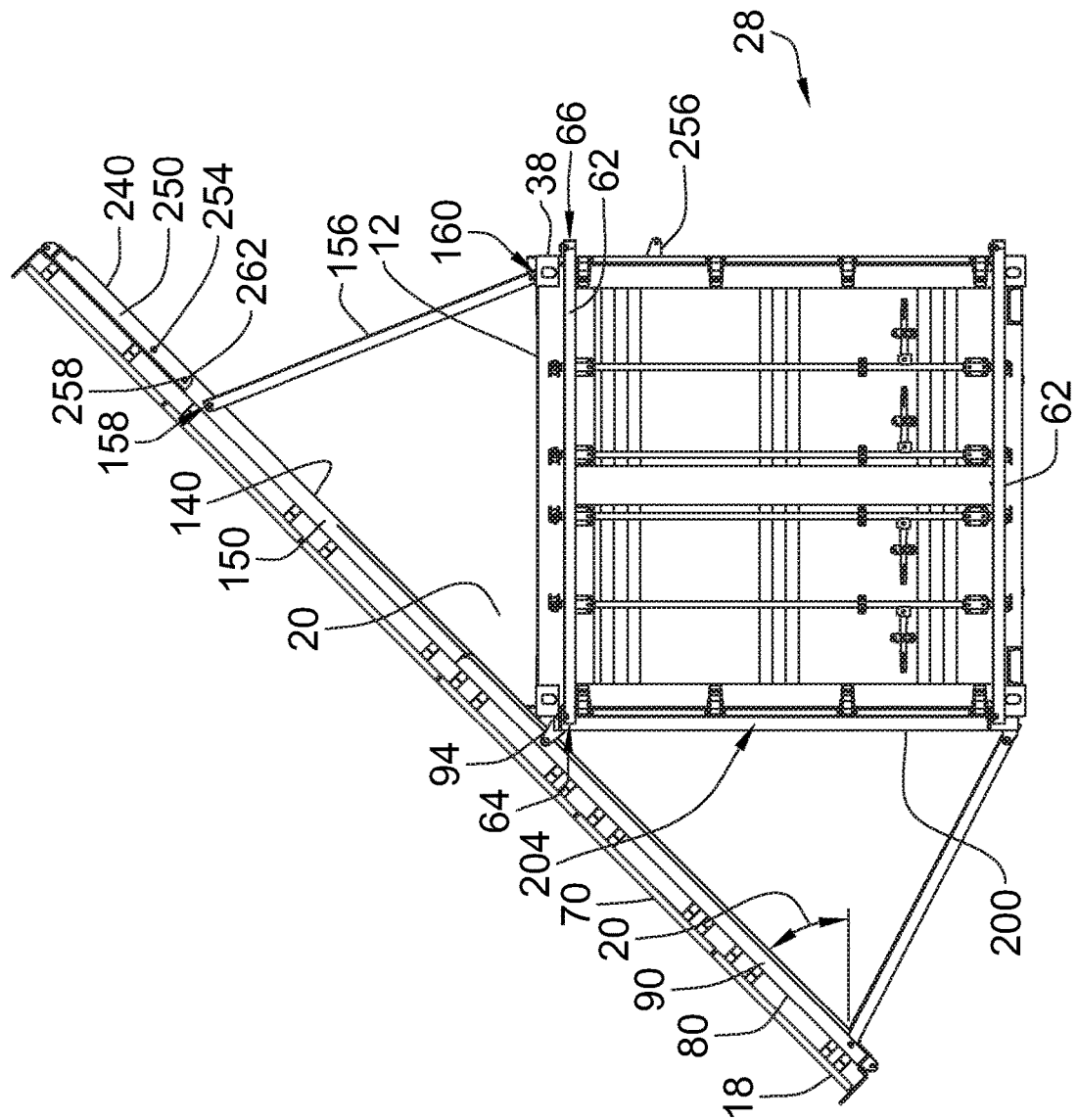
FIG. 9 is a side view of the second end of the apparatus of FIG. 8 in a deployed position.
Figure 10:
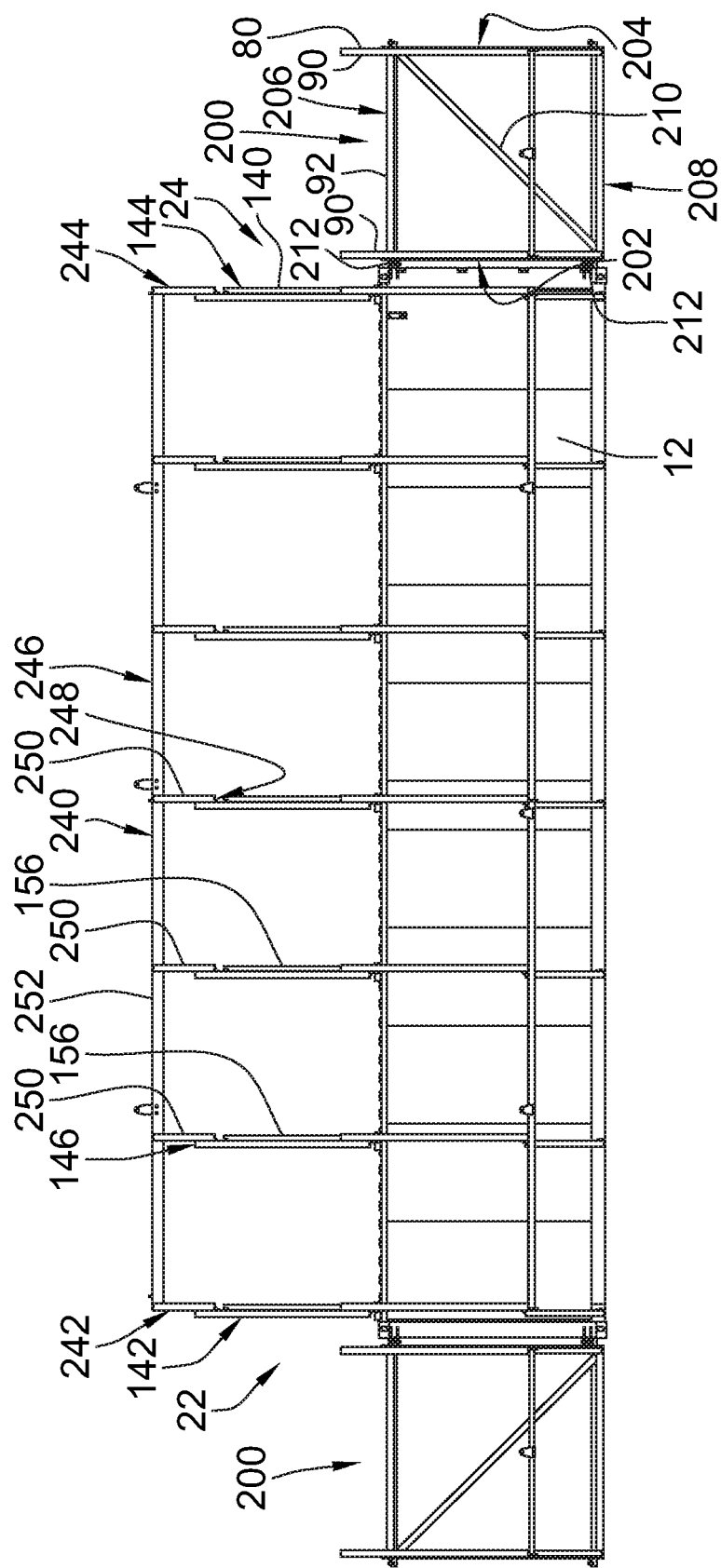
FIG. 10 is a front view of the apparatus of FIG. 8 in a deployed position.

Turning now to FIGS. 8, 9 and 10, a further embodiment of the present invention is illustrated with door frames 200 at each of the first and second ends, 22 and 24, and a top extension 240 extending from the top mounting assembly 140, as will be set out below. It should be noted that the solar cells 70 are not shown in FIG. 8 or 10 for clarity.

As illustrated in FIGS. 8 and 10, a rectangular door frame 200 is located at each of the first and second ends, 22 and 24, respectively, corresponding to each door 40. The door frame 200 extends between door frame front and rear edges, 202 and 204, respectively, and between door frame top and bottom edges, 206 and 208, respectively with a door frame cross brace 210 extending across the door frame 200 between the door frame front and rear edges, 202 and 204, as is commonly known. The door frame 200 is pivotably secured to the front 26 of the front corner post 36 at the door frame front edge 202 with hinges 212, as are commonly known, allowing for the door frame 200 to pivot between a closed position, as illustrated in FIG. 8, and an open position, as illustrated in FIGS. 9 and 10. As illustrated in FIGS.

9 and 12, the first end 64 of the door support strut 62 is pivotably secured to the door frame 200 proximate to the door frame rear edge 204 and extends to the rear corner post 38 when the door frame 200 is in the open position.

As set out above, each end solar panel 18 is comprised of a plurality of solar cells 70 secured on a door mounting assembly 80. In the present embodiment, the door mounting assembly 80 is formed as set out above, with the vertical support members 90 pivotably mounted to door support top brackets 94 secured to the door frame 200 proximate to the door frame top edge 206, as illustrated in FIG. 9. In this configuration, the door frames 200 replace the purpose of the doors 40, as set out above, and the doors 40 on the container 12 may remain in a closed position while the door frames 200 are operable to pivot between a closed and an open position. Thus allowing for the interior of the container 12 to remain secured in the open or deployed position.

Figure 11:
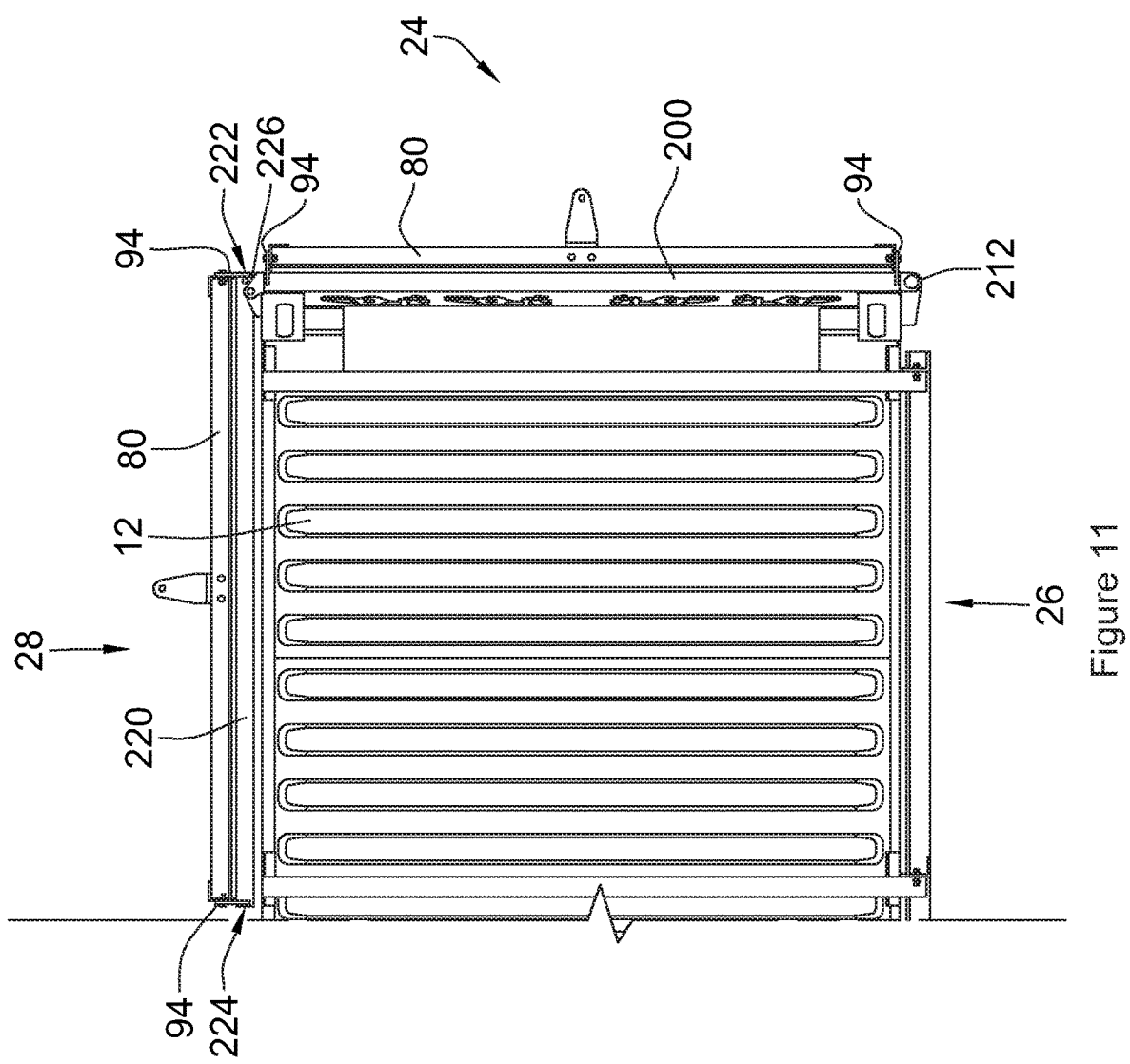
FIG. 11 is a top view of the second end of the apparatus in a stored position according to a further embodiment of the present invention
Figure 12:
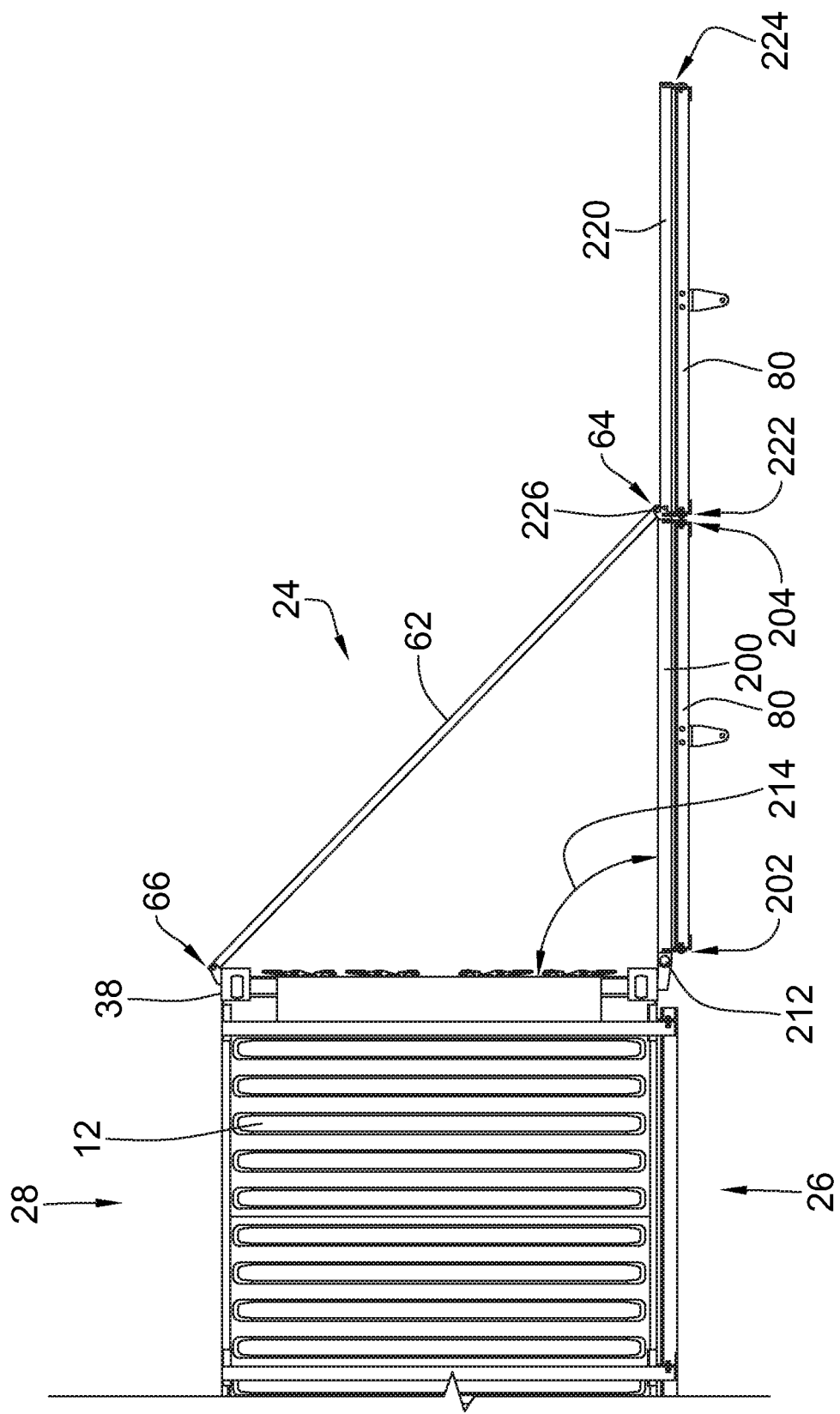
FIG. 12 is a top view of the second end of the apparatus of FIG. 10 in a deployed position.

Turning now to FIGS. 11 and 12, a further embodiment of the present invention is illustrated with a door frame extension 220 pivotably secured to the door frame 200. Although the door frame 200 and door frame extension 220 are illustrated at the second end 24 of the container 12, it will be appreciated that a corresponding door frame 200 and door frame extension 220 may be included at the first end 22, as well. For clarity, solar cells 70 are not shown in FIG. 11 or 12.

The door frame extension 220 is formed in a similar manner to the door frame 200, extending between door frame extension front and rear edges, 222 and 224, respectively. The door frame extension front edge 222 is pivotably secured to the door frame rear edge 204 with hinges 226, as are commonly known. As set out above, a door mounting assembly 80 is pivotably mounted to door support top brackets 94 secured to the door frame extension 220 similar to the configuration set out above. As illustrated in FIG. 11, with the door frames 200 in a closed position, the door frame extensions 220 may be pivoted to be in a position perpendicular to the door frame 200, such that the door frame extension 220 engages upon the rear 28 of the container 12. In this configuration, the door frame 200 and door frame extension 220 are in a stored or closed position, ready for transport. As illustrated in FIG. 12, with the door frame 200 in an open position, the door frame extension 220 may be pivoted to be in planar alignment with the door frame 200 and with the front 26 of the container 12. It will be appreciated that as the door frame 200 is secured to the container 12 with hinges 212, the door frame 200 may be positioned at any working angle 214 up to 90 degrees and may be preferably selected to be between such as, by way of non-limiting example, between 45 and 90 degrees. Similarly, the working angle of the door frame extension 220 may be selected as desired. By positioning the door frame 200 and door frame extension 220 at selected working angles, the solar cells 70 (not shown) may be best positioned to capture the sun's rays throughout a solar cycle, as is commonly known. It may be noted that although the door frame 200 and door frame extension 220 are shown in the deployed position in FIG. 12, the door mounting assemblies 80 are not shown in a deployed position, for clarity. To deploy the mounting assemblies 80, they must be tilted to a tilt angle 20, as set out above, and as illustrated in FIGS. 6 and 9. With the addition of the door frame extension 220, the apparatus 20 is capable of supporting additional solar cells 70 thus increasing power generating capacity.

Turning now to FIGS. 8, 9 and 10, the top extension mounting assembly 240 extends between first and second edges, 242 and 244, respectively, corresponding to the first and second edges, 142 and 144, respectively, of the top mounting assembly 140, and between top and bottom edges 246 and 248, respectively. The top extension mounting assembly 240 includes a horizontal support member 252 at the top edge 246 with a plurality of elongate vertical support members 250 extending therefrom to the bottom edge 248. The top extension mounting assembly 240 is pivotably secured to the top mounting assembly 140 at a pivot 254 proximate to the top edge 146 of each vertical support member 150 and spaced apart from the bottom edge 248 of each vertical support member 250, as illustrated in FIGS. 8 and 9. As best illustrated in FIG. 8, the top edge 246 of the top extension 240 may be secured to a rear bracket 256 for storage or transportation purposes, by means as are commonly known.

A mounting hole 258 extends through each vertical support member 250 proximate to the bottom edge 248 which corresponds to a mounting hole 154 in each vertical support member 150 spaced apart from the top edge 146, as illustrated in FIG. 8. The top extension 240 is pivoted about the pivot 254 in a direction shown at 260 in FIG. 8 until the top extension 240 is in planar alignment with the top mounting assembly 140 with the mounting holes 154 and 258 aligned. A fastener 262 is secured through the two mounting holes, 154 and 258, to secure the top extension 240 in place. The fastener 262 may be such as, by way of non-limiting example, a bolt and nut, a clevis fastener, or any other suitable fastener, as is commonly known. With the fastener 262 in place, the top mounting assembly 140 and top extension 240 may be raised to the deployed position, as illustrated in FIG. 9, and secured in place at a tilt angle 20 with the top support brace 156, as set out above. The addition of the top extension 240 allows for additional solar cells 70, thus increasing the power generating capacity of the apparatus 10.

When in the stored position, as illustrated in FIGS. 8 and 11, the apparatus 10 is compact and may be shrink wrapped to protect the components for transport, as is commonly known. It will also be appreciated that the compacted dimensions may be selected to be within limits for local highway transportation which may or may not need extra flagging and/or pilot cars as are commonly known.

While specific embodiments of the invention have been described and illustrated, such embodiments should be considered illustrative of the invention only and not as limiting the invention as construed in accordance with the accompanying claims.

What is claimed is:

1. An apparatus for portable power generation comprising:
    an intermodal container having a front, a rear, a top and a bottom and extending between first and second ends, said intermodal container having a front and a rear corner post extending between said top and said bottom at each of said first and second ends and doors selectably enclosing said first and second ends;
    a door frame separate from and independently rotatably relative to said doors, extending between proximate and distal ends, said proximate end hingedly secured to said front corner post along a vertical axis; and
    at least one solar panel hinged to a top edge of said door frame along a horizontal axis so as to be rotatable from a stored position substantially horizontal and parallel to said door frame and an extended position with a tilt angle between said at least one solar panel and said door frame;

wherein said door frame is operable to pivot between a closed position parallel to end doors at said each of said first and second ends, and an open position extending from each of said first and second ends at a working angle thereto.

2. The apparatus of claim 1 wherein said working angle is between 45 and 90 degrees.

3. The apparatus of claim 1 wherein said tilt angle is between 0 and 90 degrees.

4. The apparatus of claim 1 further comprising at least one door support brace extending between proximate and distal ends, said at least one door support brace pivotably secured to said at least one solar panel at said proximate end of said at least one door support brace.

5. The apparatus of claim 4 wherein said rear corner post includes at least one door support bracket on an outer surface of said door frame for selectably securing said at least one door support brace thereto.

6. The apparatus of claim 1 wherein said door frame includes at least one strut extending between proximate and distal ends, said at least one strut pivotably secured to an inner surface of said door frame at said proximate end of said at least one strut for selectably securing to said intermodal container in said open position.

7. The apparatus of claim 1 further comprising a door frame extension extending between proximate and distal ends.

8. The apparatus of claim 7 wherein said proximate end of said door frame extension is pivotably secured to said distal end of said door frame along a vertical axis.

9. The apparatus of claim 8 wherein said door frame extension is pivotable between a first position perpendicular to said door frame and a second extended position in endwise planar alignment with said door frame.

10. The apparatus of claim 9 wherein said door frame extension is parallel to said rear of said intermodal container when said door frame extension is in said first position and said door frame is in said closed position.

11. The apparatus of claim 7 further comprising at least one solar panel hinged to a top edge of said door frame extension along a horizontal axis, said at least one solar panel pivotable between a first position parallel to said door frame extension and a second extended position with a tilt angle between said at least one solar panel and said door frame extension so as to be substantially aligned in parallel with said at least one solar panel secured to said door frame.

12. The apparatus of claim 1 further comprising at least one solar panel hinged to a top front edge of said intermodal container.

13. The apparatus of claim 12 wherein said at least one solar panel comprises a front solar panel pivotable between a front first position parallel to said front of said intermodal container and a front second extended position with a front tilt angle between said front solar panel and said front of said intermodal container.

14. The apparatus of claim 12 wherein said at least one solar panel comprises a top solar panel pivotable between a top first position parallel to said top of said intermodal container and a top second extended position with a top tilt angle between said top solar panel and said top of said intermodal container.

15. The apparatus of claim 14 wherein said at least one solar panel further comprises a top extension solar panel pivotably secured to a top edge of said top solar panel, said top extension solar panel pivotable between a stored position proximate to said rear of said intermodal container when said top solar panel is in said top first position and a deployed position wherein said top extension solar panel is in planar alignment with said top solar panel.

16. A method for portable power generation comprising:
locating an intermodal container at a desired location;
pivoting an end door frame extending between front and rear of said intermodal container about a front corner post on said intermodal container about a vertical axis to from a closed position proximate to and substantially parallel to an end door of the intermodal container to an open position such that said end door frame extends at a working angle between said end door frame and an end of said intermodal container, wherein said end door frame is separate from a door of said intermodal container so as to be rotatable of said door; and
pivoting at least one door frame solar panel about a horizontal axis along a top edge of said end door frame from a stored position substantially parallel to said door frame into an extended position with a tilt angle between said at least one door frame solar panel and said door frame.

17. The method of claim 16 wherein said working angle is between 45 and 90 degrees.

18. The method of claim 16 further comprising securing said end door frame in said open position with at least one strut extending between said end door frame and said intermodal container.

19. The method of claim 16 further comprising securing said at least one door frame solar panel in said extended position with at least one door frame support brace extending between said at least one door frame solar panel and said end door frame.

20. The method of claim 16 further comprising:
pivoting a door frame extension extending between proximate and distal ends about a distal end of said door frame along a vertical axis between a first position perpendicular to said door frame and a second extended position in endwise planar alignment with said door frame; and
pivoting at least one solar panel hinged to a top edge of said door frame extension along a horizontal axis, from a first position parallel to said door frame extension to a second extended position with a tilt angle between said at least one solar panel and said door frame extension so as to be substantially aligned in parallel with said at least one solar panel secured to said door frame.

21. The method of claim 16 further comprising:
pivoting at least one top solar panel about a top front edge of said intermodal container into a top extended position with a top extension angle between said at least one top solar panel and a top of said intermodal container; and
pivoting at least one front solar panel about a top front edge of said intermodal container into a front extended position with a front extension angle between said at least one front solar panel and said front of said intermodal container.

* * * * *